United States Patent
Kawamura et al.

(10) Patent No.: US 9,441,942 B2
(45) Date of Patent: Sep. 13, 2016

(54) RESOLVER AND MULTIPLE-ROTATION DETECTOR

(71) Applicant: OKUMA Corporation, Niwa-gun, Aichi (JP)

(72) Inventors: Soichi Kawamura, Aichi (JP); Motozumi Yura, Aichi (JP); Shinji Shibata, Niwa-gun (JP)

(73) Assignee: OKUMA Corporation, Aichi (JP)

( * ) Notice: Subject to any disclaimer, the term of this patent is extended or adjusted under 35 U.S.C. 154(b) by 110 days.

(21) Appl. No.: 13/930,343

(22) Filed: Jun. 28, 2013

(65) Prior Publication Data

US 2014/0002064 A1 Jan. 2, 2014

(30) Foreign Application Priority Data

Jun. 29, 2012 (JP) .................. 2012-146635

(51) Int. Cl.
*G01B 7/30* (2006.01)
*G01D 5/20* (2006.01)

(52) U.S. Cl.
CPC ............... *G01B 7/30* (2013.01); *G01D 5/2046* (2013.01)

(58) Field of Classification Search
CPC ................................ G01B 7/30; G01D 5/2046
USPC ........................................ 324/207.16–207.25
See application file for complete search history.

(56) References Cited

U.S. PATENT DOCUMENTS

| | | | |
|---|---|---|---|
| 2003/0090223 A1* | 5/2003 | Nishizawa et al. | 318/268 |
| 2011/0156699 A1* | 6/2011 | Shibata et al. | 324/207.25 |
| 2011/0279112 A1* | 11/2011 | Aihara et al. | 324/207.25 |
| 2012/0080286 A1* | 4/2012 | Kasuya et al. | 192/113.3 |

FOREIGN PATENT DOCUMENTS

| | | |
|---|---|---|
| CN | 102128640 A | 7/2011 |
| JP | S6153503 A | 3/1986 |
| JP | H05-10779 A | 1/1993 |
| JP | H09-318304 A | 12/1997 |

(Continued)

OTHER PUBLICATIONS

Office Action in counterpart Japanese Patent Application No. 2012-146635 mailed on Jan. 5, 2016 (6 pages).

(Continued)

*Primary Examiner* — Arleen M Vazquez
*Assistant Examiner* — Brent J Andrews
(74) *Attorney, Agent, or Firm* — Osha Liang LLP

(57) ABSTRACT

A stator includes: a core formed by laminating magnetic steel sheets; and an excitation coil and a detection coil which are wound around teeth provided at the core. The core includes a peripheral section which is disposed to surround the rotor and a detection section which is disposed at the interior of the peripheral section and has the teeth. When the magnetic steel sheets are laminated, each of the magnetic steel sheets forming the core includes a portion which constitutes the peripheral section and a portion which constitutes the detection section. The detection section is substantially U-shaped, and both sides of the U-shape become a pair of teeth which form one phase. A base portion of the substantially U-shape of the detection section connects with the peripheral section, and gaps are provided between the peripheral section and a part of the base portion which is the root of the teeth.

3 Claims, 5 Drawing Sheets

(56) References Cited

FOREIGN PATENT DOCUMENTS

| JP | 2003-207370 A | 7/2003 |
|----|---------------|--------|
| JP | 2011135682 A | 7/2011 |
| JP | 2011-185656 A | 9/2011 |
| JP | 2012-078238 A | 4/2012 |

OTHER PUBLICATIONS

Office Action in counterpart Chinese Patent Application No. 2016030101653420 mailed on Mar. 4, 2016 (10 pages).

Office Action in counterpart Japanese Patent Application No. 2012-146635 mailed on Jun. 21, 2016 (6 pages).

* cited by examiner

RESOLVER AND MULTIPLE-ROTATION DETECTOR

PRIORITY INFORMATION

This application claims priority to Japanese Patent Application No. 2012-146635 filed on Jun. 29, 2012, which is incorporated herein by reference in its entirety.

BACKGROUND

1. Technical Field

The present invention relates to a resolver and a multiple-rotation detector which comprises a plurality of resolvers.

2. Related Art

A resolver includes a rotor which rotates together with a shaft and a stator which is located around the rotor. The rotor is shaped like an eccentric disc, an ellipse, or the like in which a distance between the rotation center of the rotor and the surface thereof is different depending on an angular position thereof. Accordingly, when the rotor rotates, a gap between the rotor and the stator is changed at a certain fixed position on the stator. The stator includes a detector which detects this gap. The detector includes a coil, detects the change of a magnetic flux density caused by the change of a gap between the rotor and the stator, and measures the gap.

A single resolver can detect an angular position of a shaft, on which the rotor is mounted, through one rotation, but cannot detect an angular position (an absolute angular position) thereof through a plurality of rotations. A multiple-rotation detector which detects an angular position through a plurality of rotations is known. The multiple-rotation detector comprises a shaft, a single or a plurality of speed-reduced rotational element/elements in which the rotational speed of this shaft is reduced, and a resolver which can detect a rotation angle of this speed-reduced rotational element during one rotation. As a result, the multiple-rotation detector can detect the angular position of the shaft over a plurality of rotations, for example, hundreds of rotations.

FIG. 1 is a cross-sectional view perpendicular to an axis of reluctance resolvers of a multiple-rotation detector of a conventional example. FIG. 2 is a cross-sectional view taken along the portion A-A illustrated in FIG. 1. FIG. 3 is a cross-sectional view taken along the portion B-B illustrated in FIG. 1.

A reluctance resolver in FIG. 1 has three resolvers which are located on the same plane. The rotation centers of rotors 32, 27, 25 of the respective resolvers are located so that the rotation centers thereof are positioned at respective vertexes of an isosceles triangle. Additionally, four teeth 1 to 4 are provided on the periphery of the rotor 32, four teeth 5 to 8 are provided on the periphery of the rotor 27, and four teeth 9 to 12 are provided on the periphery of the rotor 25, respectively. An excitation winding and a detection winding are wound around each of these teeth via a bobbin, and the windings are electrically connected to respective pins of a connector 14. Further, the connector 14 is electrically connected to an unillustrated connector in a signal processing circuit. The teeth 1 to 12 are supported on a stator 66 and the stator 66 is supported on a casing 16 via a spacer 17 and a casing 19 via a spacer 18. The rotors 32, 27, 25 and the stator 66 are formed of a magnetic material. An input shaft 31 is supported on the casing 16 via a bearing 40 and on the casing 19 via a bearing 45. A gear 34, which is formed of a non-magnetic material, and the rotor 32 are fitted to the input shaft 31. A shaft 13 is supported on the casing 16 via a bearing 41 and on the casing 19 via a bearing 42. A gear 30 formed of a non-magnetic material and a gear 15 formed of a non-magnetic material are fitted to the shaft 13. A gear 54 formed of a non-magnetic material and the rotor 27 are mounted to a shaft 21 via a bearing 28. A gear 50 formed of a non-magnetic material and the rotor 25 are mounted to a shaft 22 via a bearing 26.

A speed-reduction gear mechanism is formed by engagement of the gear 34 and the gear 30, engagement of the gear 15 and the gear 54, and engagement of the gear 15 and the gear 50. The gear 54 is adhered to the rotor 27 and the gear 50 is adhered to the rotor 25. In accordance with the above-described speed-reduction mechanism, when the input shaft 31 makes 24 rotations, the rotor 27 makes one rotation, and when the input shaft 31 makes 25 rotations, the rotor 25 makes one rotation.

By applying a pulse voltage between the pins for excitation of the connector 14, a voltage corresponding to an angular position of the rotor is generated between the pins for detection of the connector 14. The angular position of the rotor of each of the resolvers can be calculated by performing an interpolation operation of this voltage. An absolute angular position of the input shaft 31 within one rotation can be detected at the resolver which comprises the teeth 1 to 4 and the rotor 32. An absolute angular position of the input shaft 31 within 25 rotations can be detected at the resolve which comprises the teeth 5 to 8 and the rotor 27. An absolute angular position of the input shaft 31 within 24 rotations can be detected at the resolver which comprises the teeth 9 to 12 and the rotor 25. Further, by numerically processing the detected values of the three absolute positions of these three resolvers, the position of the input shaft 31 up to 600 rotations can be detected with a high degree of accuracy.

In the aforementioned conventional resolver and multiple-rotation detector, one phase of the resolver is formed of one tooth. Consequently, the resolver and the multiple-rotation detector are easily subjected to the influence of magnetic field noise from outside. Therefore, it is necessary to move away from a noise source, dispose a magnetic shield at the exterior of the detector, or the like.

FIG. 4 is an enlarged view of the periphery of the rotor 32 in FIG. 1. A magnetic flux which is excited to detect a rotor angular position is shown by a line 68 in FIG. 4. Hereinafter, this excited magnetic flux will be referred to as a magnetic flux 68. The magnetic flux 68 comes out of the tooth 1, passes through the interior of the rotor 32, the tooth 2 or the tooth 4, the interior of a tooth supporting member of the stator 66, and returns to the tooth 1. A magnetic flux line which comes out of the tooth 3 similarly passes through the interior of the rotor 32, the tooth 2 or the tooth 4, the interior of a tooth supporting member of the stator 66, and returns to the tooth 3. When a magnetic flux 67 generated by magnetic field noise enters the stator 66 from outside, the noise magnetic flux 67 and the magnetic flux 68 which is used to detect the rotor angular position magnetically interfere with each other within the tooth supporting member. As a result, an error occurs at the calculated absolute angular position. Moreover, in a case where a plurality of resolvers are disposed on the same plane, an amount of magnetic interference is changed and complicated depending on entering directions of the noise magnetic flux, making the correction difficult.

SUMMARY

The present invention has been made to solve the above-mentioned problems, and an object thereof is to provide a resolver and a multiple-rotation detector which have high noise immunity and a high degree of accuracy.

A resolver of the present invention forms a detection section, i.e., one phase of the resolver, which measures a gap between a rotor and a tooth at a certain angular position using a U-shaped core. This U-shaped core and the rotor form a magnetic circuit. Based on the change of reluctance in this magnetic circuit, a rotational position of a shaft is detected. In short, a resolver of the present invention includes: a rotor which rotates; and a stator which is disposed on the periphery of the rotor, the stator including a core which is formed by laminating magnetic steel sheets and an excitation coil and a detection coil which are wound around teeth provided at the core. The core of the stator includes a peripheral section which is disposed so as to surround the rotor and a detection section which has the teeth and is disposed at the interior of the peripheral section. Each of the laminated magnetic steel sheets includes a portion which constitutes the peripheral section and a portion which constitutes the detection section at the time of lamination. The detection section is substantially U-shaped, and both sides of the U-shape constitute the pair of teeth which form one phase. Then, a base portion of the U-shape of the detection section connects with the peripheral section and gaps are provided between the peripheral section and a part of the base portion which is the root of the teeth.

Since the base portion of the U-shape of the detection section of the core connects with the peripheral section thereof, and the gaps are provided between the peripheral section and the part of the base portion which is the root of the teeth, a portion which connects the detection section of the core and the peripheral section thereof becomes small, and magnetic influence therebetween is reduced. Consequently, an excitation magnetic flux which passes through the detection section of the core and is used to detect an angular position is separated from a magnetic flux which is caused by magnetic field noise from outside and passes through the peripheral section. In this way, interference of the magnetic flux caused by the magnetic field noise from outside with the excitation magnetic flux can be prevented.

Further, the detection section of the core of the stator and the peripheral section thereof are integrally formed. Thus, the number of parts can be reduced.

The multiple-rotation detector which has the plurality of above resolvers and in which the resolvers are connected so that the rotor of each of the resolvers rotates at a predetermined rotational speed ratio, can be provided.

In the aforementioned multiple-rotation detector, at least two resolvers can be disposed-on the same plane and cores of these resolvers can be formed of the same magnetic steel sheet.

In the resolver and the multiple-rotation detector of the present invention, the detection section employs a structure which reduces the influence of magnetic field noise from outside. Accordingly, even under a high magnetic field noise environment, such as in the periphery of a motor power line, it is not necessary to move a noise source away from the detector or dispose a magnetic shield at the exterior of the detector. Therefore, the multiple-rotation detector which has high noise immunity and a high degree of accuracy can be provided without incurring design cost spent on noise measures, such as a modification of rerouting the motor power line of the noise source, an operation cost, and the cost of parts that counteract noise, such as a magnetic shield.

DETAILED DESCRIPTION

A reluctance resolver which is a preferred embodiment of a multiple-rotation detector according to the present invention will be described below in accordance with the drawings.

Figure 1:
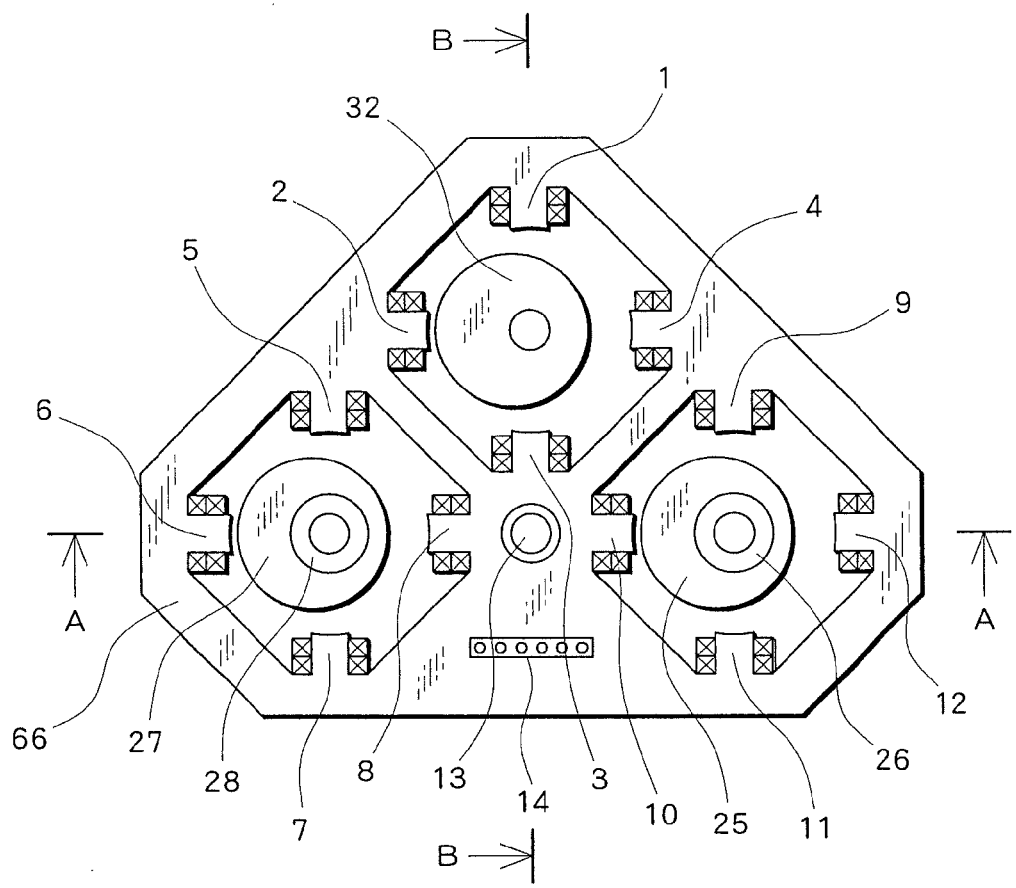
FIG. 1 is a cross-sectional view of a conventional reluctance resolver.
Figure 2:
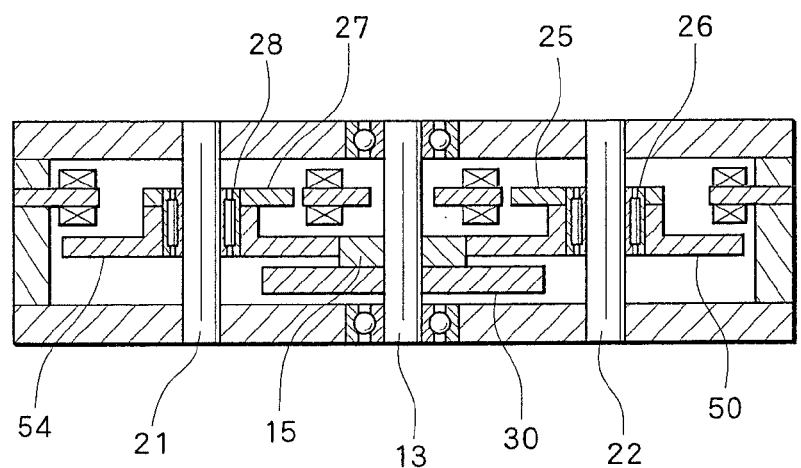
FIG. 2 is a cross-sectional view taken along A-A in FIG. 1.
Figure 3:
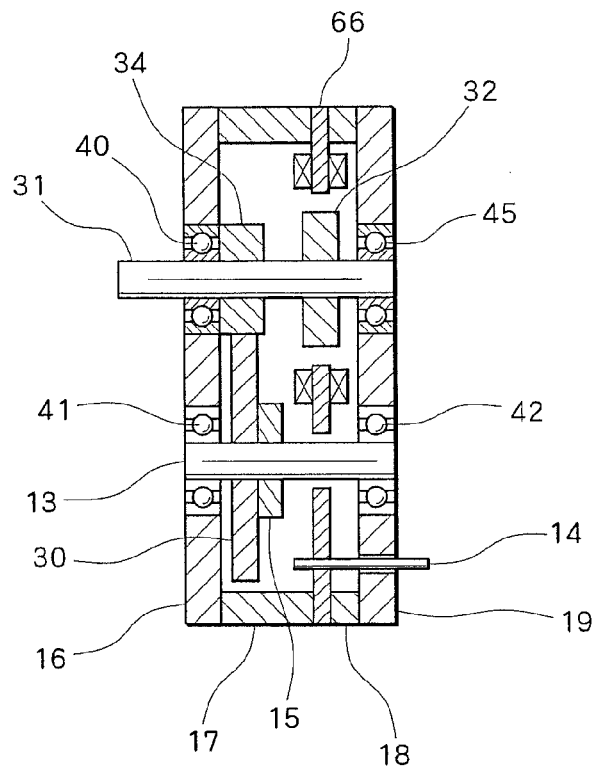
FIG. 3 is a cross-sectional view taken along B-B in FIG. 1.
Figure 4:
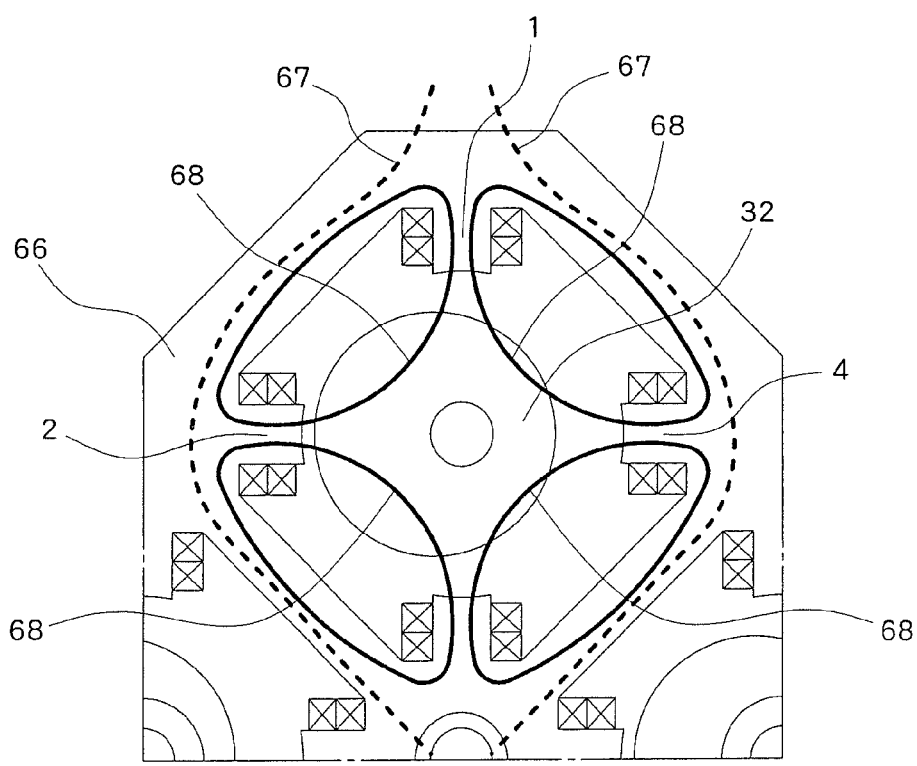
FIG. 4 is an enlarged view of the periphery of a rotor in FIG. 1.
Figure 5:
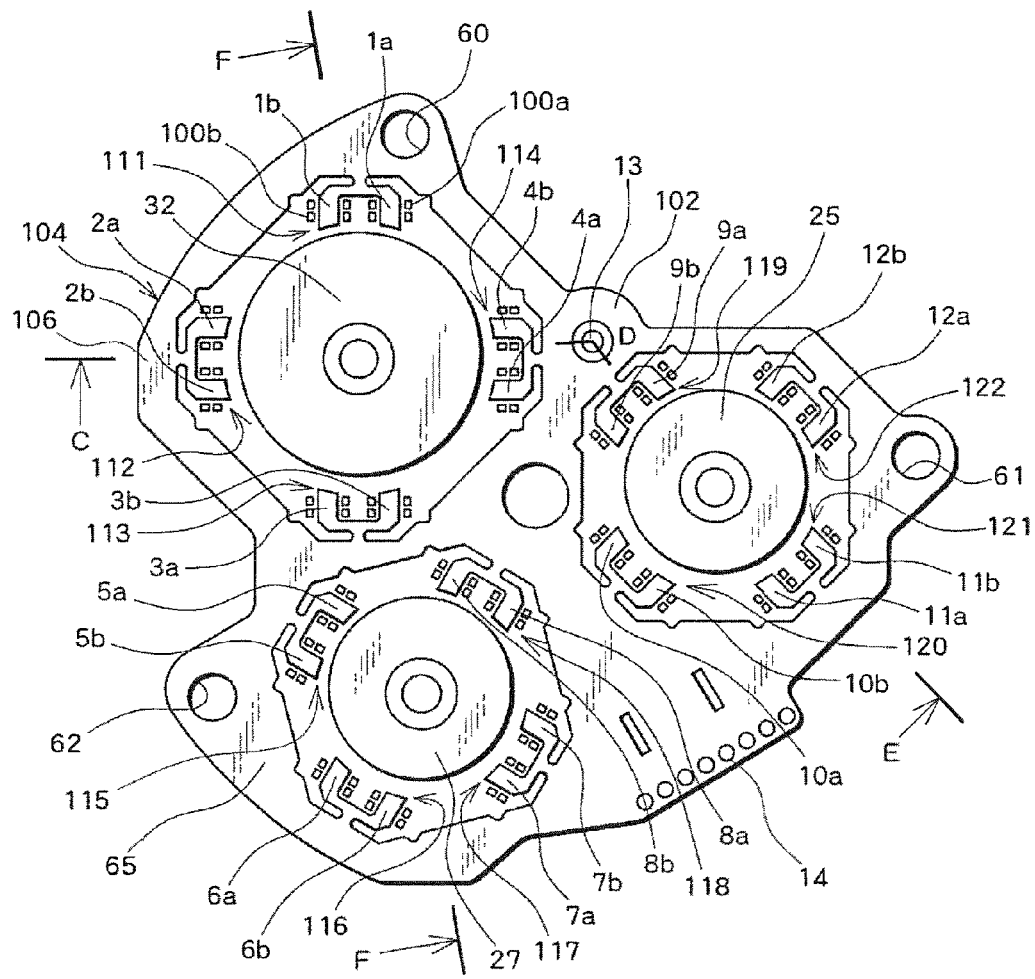
FIG. 5 is a schematic diagram of a reluctance resolver according to an embodiment of the present invention.
Figure 6:
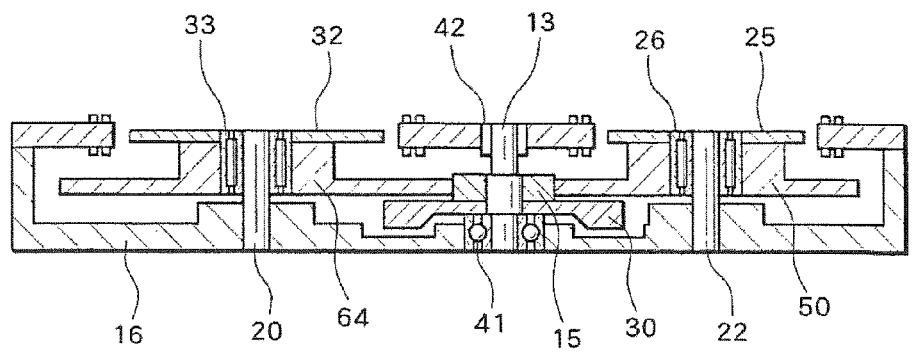
FIG. 6 is a cross-sectional view taken along C-D-E in FIG. 5.
Figure 7:
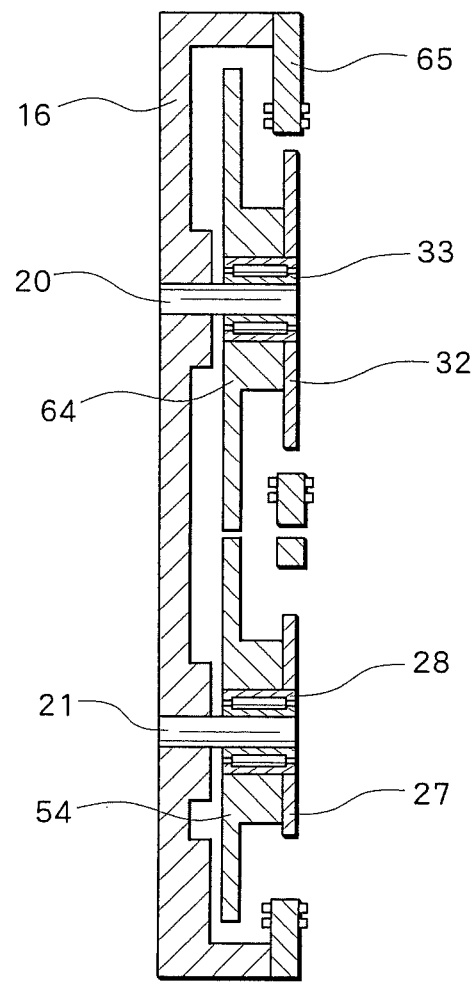
FIG. 7 is a cross-sectional view taken along F-F in FIG. 5.
Figure 8:
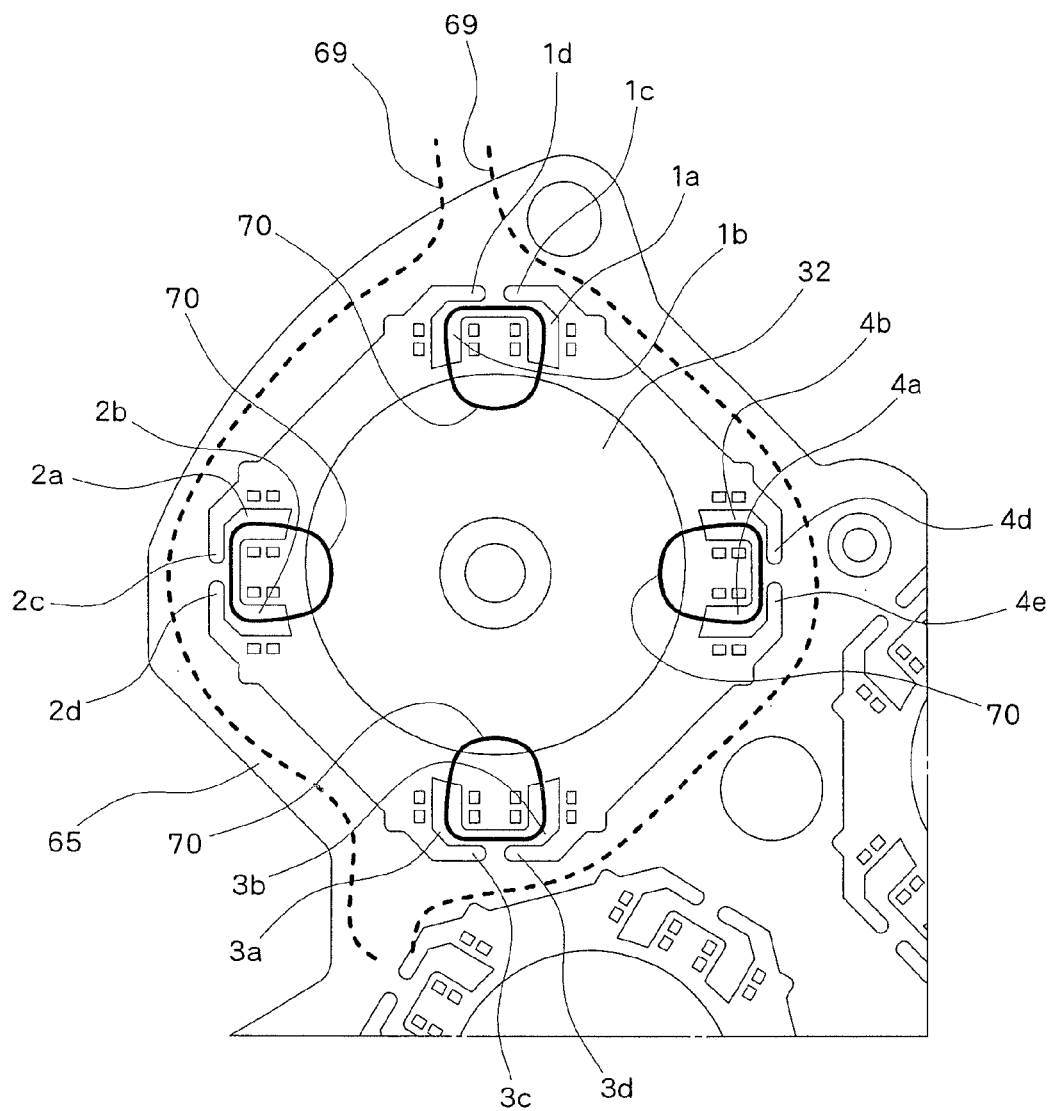
FIG. 8 is an enlarged view of the periphery of the rotor in FIG. 5.

FIG. 5 is a diagram of a reluctance resolver in a preferred embodiment of the present invention which is seen from a surface perpendicular to an axis thereof. FIG. 6 is a cross-sectional view taken along the portion C-D-E illustrated in FIG. 5. FIG. 7 is a cross-sectional view taken along the portion F-F illustrated in FIG. 5. FIG. 8 is an enlarged view of the periphery of a rotor 32 illustrated in FIG. 5. Structures similar to those of the prior art illustrated in FIGS. 1, 2, 3, and 4 are described using the same reference numerals, and descriptions thereof are omitted.

In the reluctance resolver in FIG. 5, three resolvers ared disposed on the same plane. Further, eight teeth 1a to 4b are provided on the periphery of a rotor 32, eight teeth 5a to 8b are provided on the periphery of a rotor 27, and eight teeth 9a to 12b are provided on the periphery of a rotor 25. The rotors 32, 27, 25 are circular. The rotor 32 is eccentrically clamped on an outer race of a bearing 33 and rotates around a shaft 20. The rotor 27 is eccentrically clamped on an outer race of a bearing 28 and rotates around a shaft 21. The rotor 25 is eccentrically clamped on an outer race of a bearing 26 and rotates around a shaft 22. Gears 64, 54, 50 are respectively clamped on the outer races of the bearings 33, 28, 26. In this way, the gears 64, 54, 50, which respectively correspond to the rotors 32, 27, 25, are integrally rotated. A stator 65 includes a stator core 104 which is laminated by magnetic steel sheets 102 and a coil which is wound around a portion of the stator core 104. The stator core 104 includes a peripheral section 106 which is disposed so as to surround the periphery of each of the rotor and a detection 111-122 which is disposed at the interior of the peripheral section 106 and is adjacent to the rotor. An excitation coil and a detection coil are wound around the detection section 111-122. As illustrated in FIG. 5, the detection section 111-122 is a U-shaped and a bottom portion or a base of the U-shape is connected to the peripheral section 106. Both sides of the U-shape extended toward the rotor and constitute a pair of teeth (e.g., the teeth 1a, 1b). The other detection section 111-122 are formed in the same way.

The peripheral sections of the three resolvers are integrally formed, and further, the detection sections thereof are integrally formed with the peripheral sections. One sheet of the magnetic steel sheet which forms the stator core also has a portion which constitutes a peripheral section and a portion which constitutes a detection section. The shape of one magnetic steel sheet is illustrated in FIG. 5 and the core is formed by laminating a plurality of magnetic steel sheets having this shape.

A conducting wire is wound around the pair of teeth 1*a* and 1*b* in opposite directions to each other, and then coils 100*a*, 100*b* are formed. The one coil 100*a* constitutes an excitation coil and the other coil 100*b* constitutes a detection coil. These coils 100*a*, 100*b* form one phase of the resolver. Additionally, regarding the teeth 2*a* to 12*b*, the wire is similarly wound around the adjacent two teeth in opposite directions to each other, thereby forming the coils. A pair of two adjacent teeth form one phase of the resolver. As illustrated in FIG. 8, gaps 1*c*, 1*d* are provided between the root of the teeth 1*a*, 1*b* and the peripheral section of the stator. Similarly, gaps are provided at the roots of the teeth 2*a* to 12*b*. Namely, only the vicinity of the center of the base of the U-shaped detection section is connected to the peripheral section of the core and the detection section is supported by the peripheral section. The stator 65 which supports these teeth is mounted onto a casing 16 by a bolt with a screw through holes 60, 61, 62.

A gear fitted to an unillustrated input shaft and a gear 30 illustrated in FIG. 6 are engaged, and in this way, a shaft 13 and a gear 15 attached thereto are driven. The gear 15 engages with the gears 64, 50 and then drives the rotors 32, 25. The gear 64 engages with the gear 54 and then drives the rotor 27. In this way, by combining the gears and forming a speed-reduction mechanism, the shaft 13 makes two rotations when the unillustrated input shaft makes five rotations, the rotor 32 makes 15 rotations when the shaft 13 makes 64 rotations, the rotor 27 makes 32 rotations when the rotor 32 makes 27 rotations, and the rotor 25 makes three rotations when the shaft 13 makes ten rotations. By numerically processing the detected values of the absolute angular positions of these three resolvers, the position of the unillustrated input shaft up to 7200 rotations can be detected with a high degree of accuracy.

As illustrated by a line 70 in FIG. 8, a magnetic flux excited by the tooth 1*a* passes through the interior of the rotor 32, the tooth 1*b*, and the interior of a supporting section (the base of the U-shape) of the teeth 1*a*, 1*b* and returns to the tooth 1*a*. Hereinafter, this excited magnetic flux will be referred to as a magnetic flux 70. Moreover, regarding the teeth 1*b* to 12*b*, each of the excited magnetic flux lines similarly passes through the interior of a supporting section of each tooth, the tooth which is paired with each tooth, the interior of the rotor of each tooth, and returns to the original excited tooth. In other words, most of the excited magnetic flux line passes through a closed magnetic circuit formed by the U-shaped detection section of the core and the rotor, and does not go toward the peripheral section of the core.

When a magnetic flux 69 caused by magnetic field noise from outside enters the stator 65, the magnetic flux 69 does not enter the interior of the resolver, in particular, the detection section, and passes through the exterior of the tooth supporting section. Therefore, magnetic interference with the magnetic flux 70 which is used to detect a rotor angular position is reduced. As a result, in a case of the present embodiment where the three resolvers are located on the same plane, even if the noise magnetic flux which passes through the interior of the stator 65 is changed complicatedly by the entering direction of the magnetic flux caused by the magnetic field noise from outside, the absolute position detection can be effected with a high degree of accuracy.

In the above-described embodiment, a structure in which three resolvers are disposed on the same plane has been described. However, the present invention is not thus limited, and it is not always necessary that all the resolvers should be disposed on the same plane. Further, in the above embodiment, a structure has been described in which the rotor is rotated around the shaft attached to the casing via the bearing. However, a structure in which the rotor is attached to the shaft, the bearing is provided between the shaft and the casing, and the rotor rotates together with the shaft may be employed.

A preferred aspect of a multiple-rotation detector will be described below.

(1) A multiple-rotation detector formed of a plurality of resolvers, in which each rotor is rotated differently by a speed-reduction mechanism relative to the rotation of an input shaft, wherein one phase of a stator which is disposed on the periphery of the rotor is formed of two teeth, a coil is wound around the two teeth in opposite directions to each other, and gaps are provided at the root of the two teeth.

(2) The multiple-rotation detector according to the above-described (1), wherein at least two or more of the plurality of resolvers are disposed on the same plane.

What is claimed is:

1. A resolver comprising:
   a rotor which rotates; and
   a stator which is disposed on a periphery of the rotor, the stator including a core which is formed by laminating magnetic steel sheets and an excitation coil and a detection coil which are wound around teeth provided on the core,
   wherein the core has a peripheral section which is disposed so as to surround the rotor and four detection sections which are disposed at the interior of the peripheral section and have the teeth,
   when the magnetic steel sheets are laminated, each of the laminated magnetic steel sheets includes a portion which constitutes the peripheral section and a portion which constitutes the detection sections, and
   the detection sections are substantially U-shaped, and both sides of the U-shape constitute a pair of teeth which form one phase and whose ends point toward the rotor, a base portion of the substantially U-shape of the detection sections which faces the peripheral section and connects with the peripheral section, and gaps are provided between the peripheral section and a part of the base portion which is the root of the teeth,
   wherein excitation coils and detection coils are wound around the sides of the U-shape of the detection sections, and
   wherein each excitation coil is provided corresponding to only one detection section, and each detection coil is provided corresponding to only one detection section.

2. A multiple-rotation detector having the plurality of resolvers described in claim 1, wherein the plurality of resolvers are connected so that the rotor of each of the resolvers rotates at a predetermined rotational speed ratio.

3. The multiple-rotation detector according to claim 2, wherein at least two resolvers are disposed on the same plane and cores of these resolvers are formed of the same magnetic steel sheet.

* * * * *